April 30, 1968    A. J. GARAVAGLIA ETAL    3,380,622
METHOD AND MATERIAL FOR HERMETICALLY SEALING CONTAINERS
Filed Dec. 15, 1966

INVENTORS
Arthur J. Garavaglia and
Edward A. Fox
BY
ATTORNEY

United States Patent Office 3,380,622
Patented Apr. 30, 1968

3,380,622
METHOD AND MATERIAL FOR HERMETICALLY SEALING CONTAINERS
Arthur J. Garavaglia and Edward A. Fox, Cincinnati, Ohio, assignors to The Procter & Gamble Company, Cincinnati, Ohio, a corporation of Ohio
Filed Dec. 15, 1966, Ser. No. 601,889
9 Claims. (Cl. 220—53)

---

ABSTRACT OF THE DISCLOSURE

Ply materials for constructing a semi-rigid multi-ply lid and their arrangement and sequence of application in connection with the covering of an opening in a package to which the lid is to be attached by heat sealing.

---

This invention relates to a method and material for hermetically sealing containers and more particularly to a method and material for forming an easy-opening reclosable lid for hermetically sealed containers which can be used in place of conventional double-seamed sanitary cans or key-opening cans.

The subject matter hereof represents an improvement of the lid structure and method described in U.S. Patents 3,151,765 and 3,245,576, which issued on Oct. 6, 1964 and Apr. 12, 1964, respectively, to E. W. Griese, Jr., for "Reclosable Hermetically Sealed Container." In connection with such devices it has been found difficult to obtain a seal between the lid and the container by means of heat-activated adhesives and still retain the advantages of the lid being easily opened, reclosable and of sufficient strength to make the device safe for shipment in commerce.

It is an object of the present invention to obviate the above difficulty.

Another object of the present invention is to provide a lid-forming laminate which is economical to use, which may be readily formed and applied to a container to hermetically seal the container and yet be easy to open, and which has sufficient strength to be used for reclosure and for commercial shipments without auxiliary protective devices.

A further object of the present invention is to provide a method for forming a reclosable hermetically sealed lid on a container with confidence in the quality of seal and with a minimum of expense.

Briefly stated, in accordance with one aspect of this invention there is provided a method of assembling a semi-rigid multi-ply lid over an opening in the wall of a package component. The method comprises superposing a thin, gas-impermeable paper-foil laminate over the wall with a film of a heat sealing thermoplastic therebetween. The foil side of the laminate is placed contiguous a continuous portion of the surface of the wall surrounding the periphery of the opening with the paper side of the foil laminate facing outwardly. Next, the contiguous surfaces are heated and pressed together to activate the heat sealing thermoplastic and thereby develop a welded, yet peelable, hermetic seal between the foil side of the laminate and the aforesaid portion of the surface of the wall. Then a tab-equipped ply having the semi-rigid characteristics of paperboard is adhesively attached to the paper side of the laminate along substantially all of the peripheral area of the ply.

While the specification concludes with claims particularly pointing out and distinctly claiming the subject matter which is regarded as the present invention, it is believed the invention will be better understood from the following description taken in connection with the accompanying drawings in which:

Figure 1:
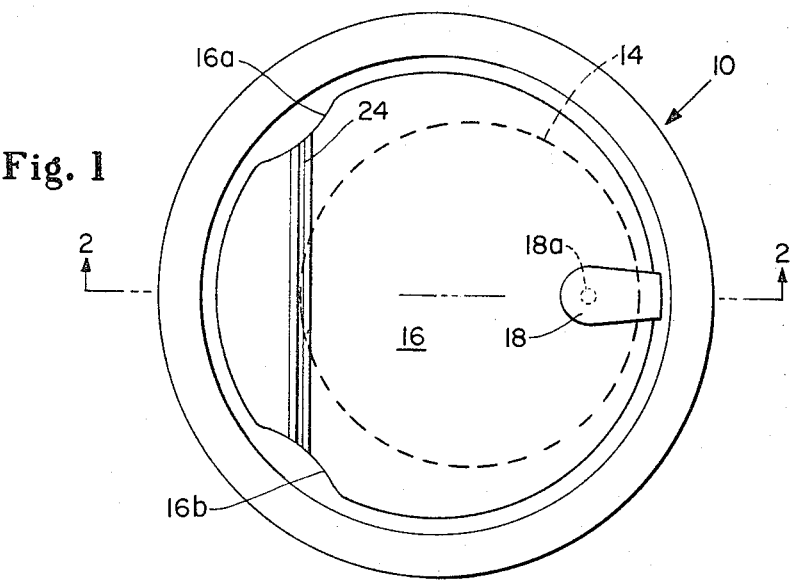
FIGURE 1 is a plan view of a reclosable, hermetically sealed can cover employing the present invention.
Figure 2:
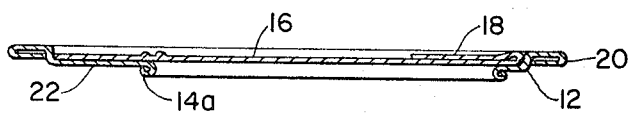
FIGURE 2 is a vertical sectional view taken along line 2—2 of FIGURE 1.

As shown in FIGURES 1 and 2 a can cover 10 employing the present invention comprises a substantially circularly shaped sheet metal closure member 12 provided with an eccentric opening 14 which is hermetically sealed about its periphery by means of a superposed lid 16 equipped with pull tab 18.

The closure member 12 illustrated is constructed of tin plate or aluminum bearing on its upper face a heat seal prime coat which is compatible with the heat seal coating which will be described in connection with the lid 16 construction. Such a prime coat can be applied in a form known as a "wash-coat" in industry. Nitrocellulose or vinyl polymers, for example, may be applied to the desired surface in a solvent solution and the solvent driven off by heat, leaving a polymer residue distributed on the treated surface as a film of thickness amounting to less than 1 mil. Such a procedure is well-known to those skilled in the plastics art. The member 12 is adapted to be attached to a can body by means of a double seam. It will be understood that although the illustrative example employs the lid 16 in connection with a closure member 12 adapted to be seamed to a can, this invention also has utility in serving as a closure for an opening in any other form of package component or wall to which a heat sealed lid can be applied. Returning, however, to the specific form of package component illustrated, seam flange 20 is of a generally inverted U-shaped section before the seam is formed, as shown most clearly in FIGURE 2. The form of can body to which the closure member 12 can be affixed and the manner and structure thereof following such affixment are well known to those of ordinary skill in the art and hence are not described herein. It will suffice to observe that the cover 10 is a package component provided with means by which it can economically be hermetically incorporated in a package.

The central portion 22 of the closure member 12 is depressed so that the lid 16, when applied, is below the level of the chine of the package and therefore protected to some extent. An eccentric opening 14 is located in the central portion 22 of the closure member 12 and preferably is provided with a rolled edge 14a to prevent exposure of a sharp edge which would be a safety hazard. The rolling of edge 14a also serves to stiffen the member 12. While the relative dimensions of the periphery of central portion 22 and the eccentric opening 14 can vary, it is preferable to have the width of the portion 22 a minimum of about 3/16" at its narrowest point and a minimum of about 1/2" at its broadest point.

The lid 16 is of a multi-ply construction including a layer of imperforate metallic foil which is hermetically sealed to a continuous area of the surface of the central portion 22 surrounding opening 14. Preferably, lid 16 is substantially circular and is weakened or scored along a score line 24 lying on a chord adapted to be placed tangentially of the eccentric opening 14 when the lid is affixed to the member 12. The score 24 extends across a portion of the periphery of the lid opposite the pull tab 18 and is adapted to form a hinge for the lid following opening. The edge of the lid 16 can be cut-out as at 16a and 16b whereby to form notches near each end of the score 24 to enable the edges of the lid near the hinge to clear the inner edge of seam flange 20 when the lid is lifted. Preferably, the pull tab 18 is folded back and secured to the top surface of lid 16 by a spot of adhesive 18a for compactness in shipping and handling prior to use.

Figure 3:
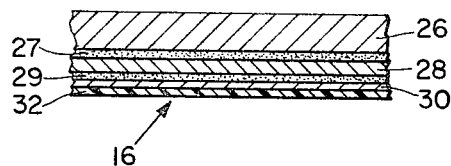
FIGURE 3 is an enlarged fragmentary vertical sectional view illustrating the details of the ply construction of the lid of FIGURES 1 and 2.

FIGURE 3 is an enlarged sectional view showing the details of the ply construction of the lid 16. The outer ply 26 may be of any material possessing semi-rigid characteristics such as those of paperboard. Measures of such semi-rigid characteristics are 250 to 1200 Taber stiffness units in the machine direction and 50 to 300 Taber stiffness units across the machine direction of the board. Preferably, such material is paperboard having a range of thickness of from about .012" to about .040". Alternatively, ply 26 can be made of a plastic which can be tenaciously glued to paper; for example, modified or high-impact styrene having a thickness in the range of from about .005" to about .015". In the latter case, the ply can be molded to size and the score can comprise a molded hinge, or the ply can be die-cut from sheet styrene with a die-formed score.

The ply 26 is adhered to an underlying ply 28 by means of a wet glue adhesive 27 such as the dextrin or the resin type, many formulations of which are known to those skilled in the art and which are commercially available. With a plastic material, the adhesive can be a solvent type resin glue. The ply 28 is constructed of paper having a basis weight (air dry) of from about 20 pounds to about 60 pounds, preferably about 40 pounds, per ream of 3000 square feet. Preferably, also, the paper has strength properties equivalent to that of solid bleached sulfate. The paper ply 28 in turn is glued by adhesive layer 29 to a thin metal foil ply 30 which can be made of aluminum, tin, steel or the like, and is imperforate and has a thickness in the range of from about .0003" to about .0015". The material comprising adhesive layer 29 can be the same type of adhesives mentioned above.

Along the lower surface of the foil ply 30 is a heat seal or film coating 32 of a thermoplastic or other heat-activated substance, e.g., polyvinyl chloride, which can range anywhere in thickness from about .0002" to about .002", preferably .001", the thickness being regulated in accordance with the amount of material required to form a hermetic seal. The coating 32 alternatively can comprise a ply of heat seal material in the form of a film attached to the lower surface of foil ply 30 by the types of adhesives described previously. In either case, the coating 32 is continuous at least about the peripheral portions of the lid 16 which are adapted to contact the central portion 22 in use.

In forming and applying the lid 16 to the closure member 12, a paper-foil laminate L of plies 28 and 30 is first prepared. This can be purchased from custom laminate manufacturers who by means of well-known commercial equipment and techniques will glue the paper ply 28 to one face of the foil ply 30 and apply the heat seal coating to the lower surface thereof in accordance with the above-described structural details. The laminate L can also be prepared by hand, brushing on the adhesive and heat seal coating in the thicknesses desired and assembling the plies as shown; however, the combination of the plies into the laminate is preferably done on commercial equipment since the tenacity of adhesion of the plies can be made more uniform and usually greater than if done by hand.

The paper-foil laminate L in sheet form is cut to the size and configuration of the lid desired by standard techniques such as die cutting. As indicated above, the lid 16 (and therefore the laminate) for use in connection with closure member 12 is desirably circular, equipped with an outwardly extending tab 18 and cutouts 16a and 16b. The size of the lid depends on the size of the opening 14 and can be varied considerably so long as the width of overlap of the lid 16 on the depressed central portion 22 (the distance between the periphery of the lid 16 and that of opening 14) is a minimum of about 3/16" in order to assure a strong hermetic seal. When a hinged reclosable lid such as that illustrated is desired, the overlap measured through the central portion of the segment of the lid defined by chord 24 should be a minimum of about ½" to prevent dissociation during repetitive use.

The outer (paperboard) ply 26 is also cut from sheet stock, preferably to the same size and configuration as the die-cut laminate L. During the die cutting operation, the score 24 is also applied. If desired, the upper surface of ply 26 can be printed before or after the cutting operation with graphic material, display advertising and the like. When a molded plastic outer ply 26 is employed, of course, the preparatory steps will differ, involving molding and trimming operations known to those skilled in the art.

Then the die-cut paper-foil laminate L is superposed on the depressed central portion 22 of closure member 12 and its position adjusted to match that desired for the completed lid 16 with relation to the opening 14. At this point the paper ply 28 faces outwardly and the foil ply 30 is contiguous to a continuous portion of the upper face of the central portion 22 of the closure member 12. In this position the exposed side of the heat seal film or coating 32 is in face-to-face contact with a continuous portion of the heat seal prime coat covering the surface of central portion 22. In order for the laminate L to lay flat on the closure member 12 the tab 18 is bent upwardly.

Next, the laminate L is joined to the closure member 12 by well known heat sealing techniques, heat and pressure being applied at least to the overlapping, i.e., contacting, portions of the laminate L and central portion 22. Because of the fact that the caliper of the laminate L is small, the heat is readily and uniformly transmitted through its thickness to rapidly raise the temperature of the heat seal film or coating 32 and of the heat seal prime coat of the closure member 12 to fusion temperature.

After the laminate L is hermetically sealed to the closure member 12, the upper ply 26 is attached to the top surface of laminate L. Either the lower surface of ply 26 or the upper surface of ply 28 of the laminate L is coated with the wet glue adhesive 27. The ply 26 is then placed on top of the laminate L with corresponding portions, e.g., the tab extension, aligned and in contact with one another and the spot 18a of adhesive is placed on the top surface of ply 26 for securement of tab 18. Next, the tab extension is folded over to the position of FIGURE 2 and pressure can be applied to maintain intimate contact until the adhesives 27 and 18a are dried.

Following formation and securement of the lid 16 on the closure member 12, the completed can cover 10 can be applied and seamed as desired to an appropriately sized can body. To open the package thus formed, the consumer grasps the free end of the tab 18 and lifts the same to fracture the joint formed by the spot of adhesive 18a. Then grasping the entire tab 18, the lid 16 is peeled from the central portion 22 by severing the hermetically formed heat seal intervening the laminate L and the central portion 22. There is no problem of failure along other portions of the assembled device since the upward pull inherently commences separation as indicated. The lid is peeled free of the underlying closure member commencing on the tab 18 side and continuing until the line of peel reaches the score 24 at which point the cover is free to be folded back with the score 24 as a hinge. The segmentally configured area of the lid 16 beside the score 24 preferably remains bonded at the wide ledge of the depressed central portion 22 for convenience of reclosure.

By the use of the subject lid and method, a uniformly strong yet peelable hermetic seal is obtained between the closure member 12 and the lid 16, as contrasted to complete lamination of a paperboard reinforced lid prior to the heat sealing operation, in which case the assembly and affixment of the lid to the closure member is both slow and non-uniform. The reason for the improvement is that in the subject invention the heat for the heat seal need only be driven through a relatively thin member, the components of which have calipers which can be controlled to close tolerances, whereas lids provided with the paperboard reinforcing prior to heat sealing present a substantially greater thickness through which the heat must penetrate to effect the heat seal and include an element (paperboard) the thickness of which is difficult to control to close tolerance. The structure and arrangement of the plies permit in the in situ lamination to proceed without experiencing strength problems with respect to the securement of the paperboard ply to the balance of the lid since a strong bond between paperboard and paper is relatively easy to achieve.

If desired, reclosure or retaining lugs such as shown in the aforesaid Griese, Jr., patents may be used to resecure the lid 16 in closed condition following initial use. In addition, it is feasible to have the tab 18 formed in the outer ply 26 only, so long as the heat seal between the foil ply 30 of the lid 16 and the closure member 12 is more frangible than the adhesive joint connecting the outer ply 36 to paper ply 28. It is also feasible to vary the size and/or shape of the lid 16 in accordance with the opening to be covered thereby. Moreover, although the size and shape of the outer ply 26 and laminate L are preferably identical, it is possible to have them differ to the extent that the same will not interfere with opening, reclosure and strength for shipment. These aspects, of course, can be checked experimentally for the relative configurations and sizes of the lid 16 components of interest.

A further permissible deviation from the described and illustrated method and structure is the placement of the heat seal coating on the upper face of the closure member 12 and the heat seal prime coat on the foil side of the laminate L, a reversal of their previous locations. Another alternative is the use of heat seal prime coats on both the laminate L and the closure member 12, in which case a separate film of heat sealing material is placed therebetween at the time of affixment of the laminate L to the member 12.

Many other modifications of the above invention can be used and it is not intended to hereby limit it to the particular embodiments shown or described. The terms used in describing the invention are used in their descriptive sense and not as terms of limitation, it being intended that all equivalents thereof be included within the scope of the appended claims.

What is claimed is:

1. The method of assembling a semi-rigid, multi-ply cover over an opening in the wall of a package component, said method comprising:
   (A) superposing a thin, gas-impermeable paper-foil laminate over said wall with a film of a heat sealing thermoplastic therebetween, the foil side of said laminate being contiguous to a continuous portion of said wall surrounding the periphery of said opening with the paper side of the laminate facing outwardly;
   (B) heating and pressing the contiguous surfaces together to activate the said heat sealing thermoplastic and thereby develop a peelable hermetic seal between the foil side of said laminate and said continuous portion of the top surface of said wall; and
   (C) adhesively attaching to the paper side of said laminate a tab-equipped ply having the semi-rigid characteristics of paperboard, said attachment being effected throughout substantially the peripheral area of said ply.

2. A package component comprising a wall having an opening therein and a semi-rigid, multi-ply lid heat sealed to a continuous portion of the outer surface of wall surrounding said opening, said lid comprising an imperforate ply of metal foil, a paper ply and a ply of semi-rigid material, said plies of metal foil and semi-rigid material being adhesively secured to opposite faces of said paper ply, said metal foil ply side of said lid being contiguous to the outer surface of said wall, said lid having a tab extension projecting from its periphery.

3. The package component of claim 2 in which said paper ply has a basis weight of from about 20 pounds to about 60 pounds per ream of 3,000 square feet.

4. The package component of claim 2 in which said semi-rigid material comprises paperboard having a range of thickness from about .012" to about .040".

5. The package component of claim 2 in which said metal foil has a thickness in the range of from about .0003" to about .0015".

6. The package component of claim 2 in which said paper ply has a basis weight of between about 20 pounds and 60 pounds per ream of 3,000 square feet and said metal foil has a thickness in the range of from about .0003" to about .0015".

7. The package component of claim 2 in which said lid overlaps said opening by at least about 3/16".

8. The package component of claim 2 in which said lid is provided with a hinge line extending across its width and oppositely disposed from said tab.

9. The package component of claim 8 in which said hinge line is placed approximately tangentially of said opening.

References Cited
UNITED STATES PATENTS

| | | | |
|---|---|---|---|
| 3,151,765 | 10/1964 | Griese | 220—53 |
| 3,182,851 | 5/1965 | Taylor | 220—53 |
| 3,245,576 | 4/1966 | Griese | 220—53 |

THERON E. CONDON, *Primary Examiner.*

GEORGE T. HALL, *Examiner.*